United States Patent
Friebe et al.

(10) Patent No.: US 11,802,731 B2
(45) Date of Patent: Oct. 31, 2023

(54) CRUCIBLE INDUCTION FURNACE AND METHOD OF CHECKING STATUS THEREOF

(71) Applicants: Konrad Friebe, Duisburg (DE); Till Schreiter, Muelheim an der Ruhr (DE)

(72) Inventors: Konrad Friebe, Duisburg (DE); Till Schreiter, Muelheim an der Ruhr (DE)

(73) Assignee: ABP INDUCTION SYSTEMS GMBH, Dortmund (DE)

( * ) Notice: Subject to any disclaimer, the term of this patent is extended or adjusted under 35 U.S.C. 154(b) by 289 days.

(21) Appl. No.: 17/061,587

(22) Filed: Oct. 2, 2020

(65) Prior Publication Data
US 2021/0102754 A1   Apr. 8, 2021

(51) Int. Cl.
| | |
|---|---|
| *F27B 14/20* | (2006.01) |
| *F27B 14/06* | (2006.01) |
| *F27B 14/10* | (2006.01) |
| *H05B 6/24* | (2006.01) |

(52) U.S. Cl.
CPC ............ *F27B 14/20* (2013.01); *F27B 14/061* (2013.01); *F27B 14/10* (2013.01); *H05B 6/24* (2013.01)

(58) Field of Classification Search
CPC .. F27B 3/08; F27B 3/28; F27B 14/061; F27B 14/10; F27B 14/14; F27B 14/20; F27B 2014/066; F27D 21/00; F27D 21/0021; F27D 21/04; F27D 99/0006; F27D 11/06; F27D 2099/0015; F27D 2021/005; H05B 6/102; H05B 6/20; H05B 6/22; H05B 6/24; H05B 6/28; H05B 6/36; H05B 6/367
See application file for complete search history.

(56) References Cited

U.S. PATENT DOCUMENTS

| | | | |
|---|---|---|---|
| 9,791,416 B2 | 10/2017 | Gebski | |
| 2009/0093978 A1* | 4/2009 | Sadri | F27D 3/1518 |
| | | | 702/56 |
| 2013/0083819 A1 | 4/2013 | Koeck | |
| 2014/0123758 A1* | 5/2014 | Gebski | G01N 29/14 |
| | | | 73/587 |

FOREIGN PATENT DOCUMENTS

| | | | | |
|---|---|---|---|---|
| CN | 103834758 A | * | 6/2014 | |
| EP | 1818638 A | | 8/2007 | |
| EP | 1818638 A2 | * | 8/2007 | ............ F27B 14/061 |
| EP | 2910651 A | | 8/2015 | |

* cited by examiner

*Primary Examiner* — Hung D Nguyen
(74) *Attorney, Agent, or Firm* — Andrew Wilford

(57) ABSTRACT

The functional condition of an induction crucible furnace is checked by first establishing a set-point parameter corresponding to an optimum functional condition of the induction crucible furnace and characterizing the vibratory behavior of same. Then, during normal operation of the furnace, an actual-value parameter of the vibratory behavior is determined. These two parameters are then compared and, if a magnitude of a difference therebetween exceeds a threshold, an alarm is generated.

12 Claims, 2 Drawing Sheets

CRUCIBLE INDUCTION FURNACE AND METHOD OF CHECKING STATUS THEREOF

FIELD OF THE INVENTION

The present invention concerns a method of checking the functional condition of an induction crucible furnace.

BACKGROUND OF THE INVENTION

An induction crucible furnace has a housing holding a furnace crucible and an induction coil surrounding same. Such induction crucible furnaces are known. Corresponding heat energy is generated by the energizing the induction coil with electrical current to melt the metal parts in the furnace crucible.

During this operation the crucible furnace coil is exposed to dynamic electromagnetic forces in the operational condition that periodically contract the same axially and expand the same in radial direction. Furthermore, radial, outwardly directed forces are generated by the heat expansion of the crucible.

Insulating intermediate layers are mounted between the windings of the coil in order to avoid a short circuit from one winding to the next winding (so-called short circuit in coil). The cited dynamic forces also act on the cited intermediate layers and damage the same dependent on the duration of use. This damage can result in a reduction of the material thickness of the intermediate layer whereby a free space of movement results for the coil winding at this place. This freedom of movement of the coil winding leads to a continuous process of damaging the intermediate layer.

This can be avoided by restraining the coil in axial and radial direction during regular maintenance works or by controlling the restraint. Nevertheless, after a certain time no sufficient thickness of the intermediate layer is but present so that the coil has to be replaced or repaired. By this, unexpected production failures can occur. Furthermore, the danger exists that the regular control of the coil restraint is omitted whereby an early failure of the coil can occur, too.

OBJECT OF THE INVENTION

It is the object of the present invention to provide a method of checking the functional condition of an induction crucible furnace to easily determine if there are defects.

SUMMARY OF THE INVENTION

According to the invention this object is attained by a method of checking the functional condition of an induction crucible furnace that comprises the following steps:
  establishing a set-point parameter corresponding to an optimum functional condition of the induction crucible furnace and characterizing the vibratory behavior of same;
  determining an actual-value parameter of the vibratory behavior in operation of the induction crucible furnace; and
  comparing both parameters and deriving the functional condition of the furnace from a magnitude of a difference therebetween.

One succeeds with the inventive diagnostic procedure to recognize possible coil defects early, especially to indicate possibly omitted maintenance by control of the coil restraint early, so that a coil change or a coil maintenance can be better preplanned and corresponding breakdown costs can be minimized. The invention emanates from the fact that, if a corresponding freedom of movement of the coil windings is present, acoustically or by other sensory analysis perceptible vibrations or oscillations of the windings are generated. The vibration performance of the furnace or of the coil in the condition of operation is used to draw conclusions with respect to the wear condition.

For instance, the changes in the vibration or oscillation performance caused by wear or missing maintenance can be expressed by the occurrence of additional characteristic vibration frequencies, higher vibration amplitudes at certain frequencies or beats that are perceptible acoustically or by other vibration pickups.

In detail, according to the inventive method a set-point parameter is provided that characterizes the vibration or oscillation behavior that corresponds to an optimum functional condition of the induction crucible furnace. This set-point parameter is used for the inventive method as set value.

In a second step this parameter characterizing the vibration or oscillation behavior is determined during the operation of the induction crucible furnace or is measured and is used in the method as actual value. In other words, any set-point parameter characterizing the vibration or oscillation behavior of the furnace or of the coil is provided in the optimum condition of the furnace and is measured in the respective condition of operation. Thereafter, the several values are compared with one another, and from the height of the difference of both values a functional condition of the furnace is derived. For instance, this can be done by a comparison with known parameters that represent the functional condition of the furnace.

For instance, the corresponding set-point parameters can be read from tables that characterize certain functional parameters of the furnace. Of course, the functional condition of the furnace is the worse the greater the difference between the set value and the actual value is.

Accordingly, with the inventive method the vibration or oscillation behavior of the crucible furnace and/or of the crucible furnace coil is determined in order to determine a coil wear, a missing maintenance and other damages with respect to the housing.

For instance, the set-point parameter corresponding to an optimum functional condition of the induction crucible furnace can be taken as known value from existing tables, performance characteristics, etc. that represent a corresponding type of furnace. However, the set-point parameter corresponding to an optimum functional condition of the induction crucible furnace can be also determined in the novel condition of the induction crucible furnace under nominal conditions. In any case, the inventive method covers both ways.

According to a modification of the inventive method a set-point parameter set corresponding to an optimum functional condition of the induction crucible furnace is provided and is measured in the operation of the induction crucible furnace. Any parameter set can be used for this that characterizes the vibratory behavior of the induction crucible furnace. Of course, if here the term "vibratory behavior of the induction crucible furnace" is mentioned this is to be primarily directed to the vibratory behavior of the induction coil.

If the parameter difference or the difference of the determined parameter values exceeds a certain value, preferably an alarm signal or another message is given that indicates a defect of the induction crucible furnace or the induction crucible furnace coil.

In addition to an individual parameter or a parameter set characterizing the vibratory behavior a range characterizing the vibratory behavior can be also used as set value that is then compared with an actual range.

A set-point parameter characterizing the vibratory behavior of the induction crucible furnace can be any parameter that can be determined by measurement in the operation of the induction crucible furnace. For instance and preferably, this can be an acoustic parameter, a movement parameter, a pressure parameter, an electric parameter, an electromagnetic parameter, etc. So, for instance, according to a preferred embodiment of the invention the parameter characterizing the vibratory behavior of the induction crucible furnace is determined by sound level measurement and is compared with a corresponding set sound level value. Here, for instance, the acoustic pressure level or the acoustic power level can be measured. Furthermore, for instance, the parameter characterizing the vibratory behavior of the induction crucible furnace can be determined by a measurement of electromagnetic waves and can be compared with a corresponding set value, too. Movement measurements and/or pressure measurements are also suitable methods in order to characterize the vibratory behavior.

Of course, the measurements are carried out with suitable sensors, for instance with inductive and/or capacitive sensors and/or piezosensors. Further appropriate contact-free measurements of furnace vibrations can be carried out by electromagnetic waves, for instance laser. A measurement of the furnace vibration movement by acceleration meters, for instance by using the piezo effect, is also appropriate.

As regards the evaluation of the determined values, this can be realized by frequency analysis, for instance with regard to additional level maxima at other frequencies in contrast to the normal condition, by long-time observation, continuously or in regular distances, by observation and comparison in respective comparable melt process conditions, for instance with complete filling of the melt and maximum furnace power, by trend observation of the maximum level with respect to certain frequencies or all frequencies, etc. Further measurement methods and evaluation methods are not excluded.

A preferred embodiment of the inventive method is characterized in that it is carried out with an induction crucible furnace with channel inductor.

Furthermore, the present invention is directed to an induction crucible furnace that is characterized in that it is designed for carrying out the above-described inventive method. Dependent on the measurement of the parameter characterizing the vibratory behavior of the furnace, this induction crucible furnace is provided with suitable sensor means, for instance means with an acoustic measurement method with a suitable sound pick-up. The signals measured by the respective sensor are converted into suitable electrical signals and sent to a suitable controller that evaluates the signals and compares the same with known standard values that characterize as set values an optimum functional condition of the induction crucible furnace.

BRIEF DESCRIPTION OF THE INVENTION

In the following the invention is described in detail by embodiments in connection with the drawing.

SPECIFIC DESCRIPTION OF THE INVENTION

Figure 1:
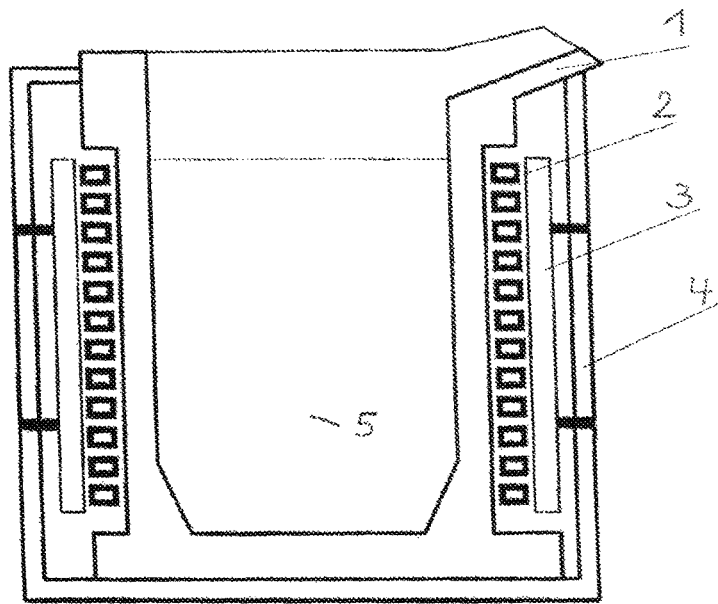
FIG. 1 is a vertical section through an induction crucible furnace strongly schematically.

FIG. 1 shows strongly schematically an induction crucible furnace that has a crucible 1 intended for holding metal parts that have been melted in the furnace. The metal parts (scrap) and/or the melt are indicated at 5.

An induction coil 2 surrounds the crucible 1 and generates heat energy for melting the metal parts 5 in the crucible 1 with corresponding electrical excitation. A magnetic yoke 3 is associated with the induction coil 2. They are surrounded by a housing 4 that forms a suitable supporting structure for the induction crucible furnace.

Above it was described that the crucible furnace coil 2 is exposed to dynamic electromagnetic forces in the operation condition that contract the coil windings periodically axially and expand them radially. Furthermore, radial, outwardly directed forces are generated by heat expansion of the crucible 1. This, in the course of time, damages intermediate insulating layers between the coil windings so that the material thickness of the intermediate layers is reduced and a free space allowing movement of the coil windings results at these points. With corresponding freedom of movement of the coil winding, the movement of the windings generated by the electromagnetic forces becomes acoustically or otherwise sensible. Now, the inventive method uses the vibratory behavior of the furnace or of the coil in the condition of operation in order to come to conclusions with regard to the functional condition (wear condition).

Figure 2:
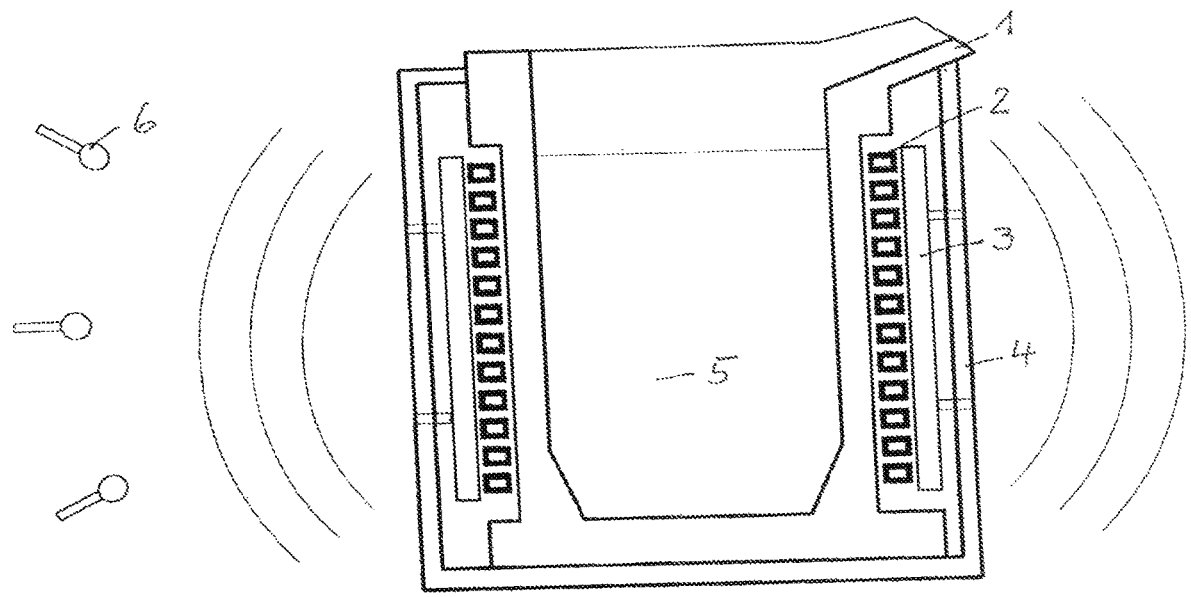
FIG. 2 shows the induction crucible furnace according to FIG. 1 with schematically indicated acoustic sensors for determining the vibratory behavior of the induction crucible coil of the induction crucible furnace.

FIG. 2 shows schematically a first embodiment of the inventive method according to which the acoustic performance of the furnace generated by vibrations of the coil windings is determined by suitable acoustic pick-ups 6. These acoustic pick-ups can be microphones. With them at least one acoustic parameter is measured and is sent to a controller (not shown) as electrical signals. The controller compares a signal value with a value of this parameter that has been measured in another condition of the furnace under nominal conditions with regard to maintenance and operation. Then the obtained difference of these values is used in order to make a diagnosis of the functional condition of the furnace. The greater the difference is, the greater is the wear of coil. If a certain level of the difference value is exceeded an alarm signal or another message can be given.

Figure 3:
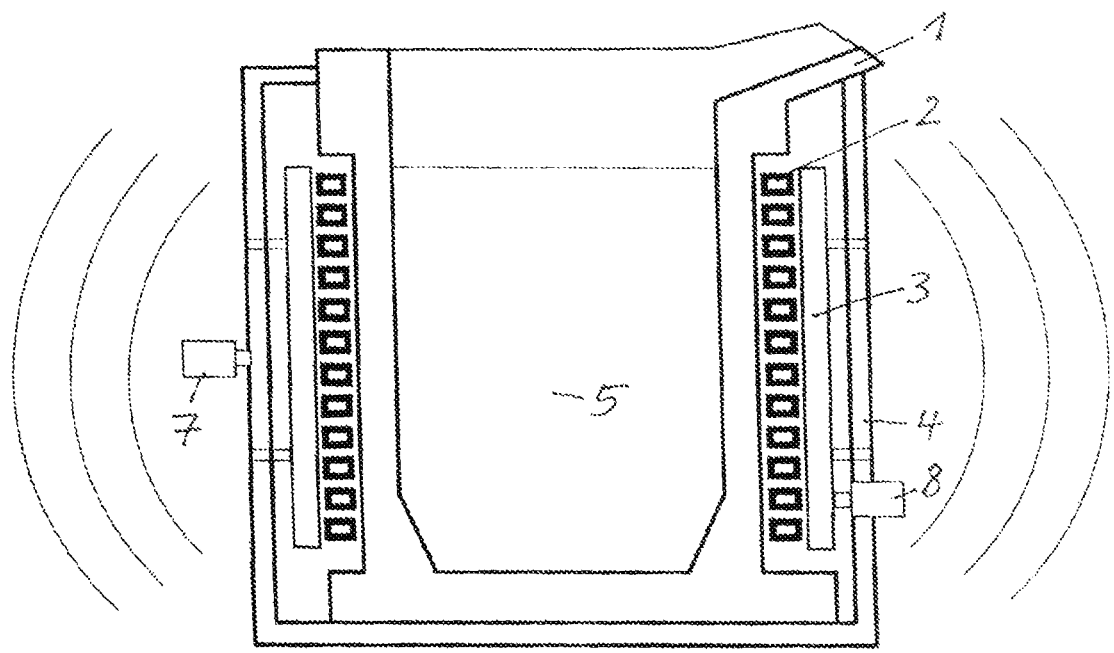
FIG. 3 shows the furnace of FIG. 1 with vibration pick-ups on the housing and on the magnetic yoke.

FIG. 3 shows an embodiment of the method according to which a vibration pick-up 7 is mounted on the housing 4 and a vibration pick-up 8 is on the magnetic yoke 3. Also in this case the determined signal values are sent to a controller as electrical signals compared with earlier determined standard signals that represent an optimum condition of the furnace. The functional condition of the furnace is derived from the difference of the corresponding values.

Figure 4:
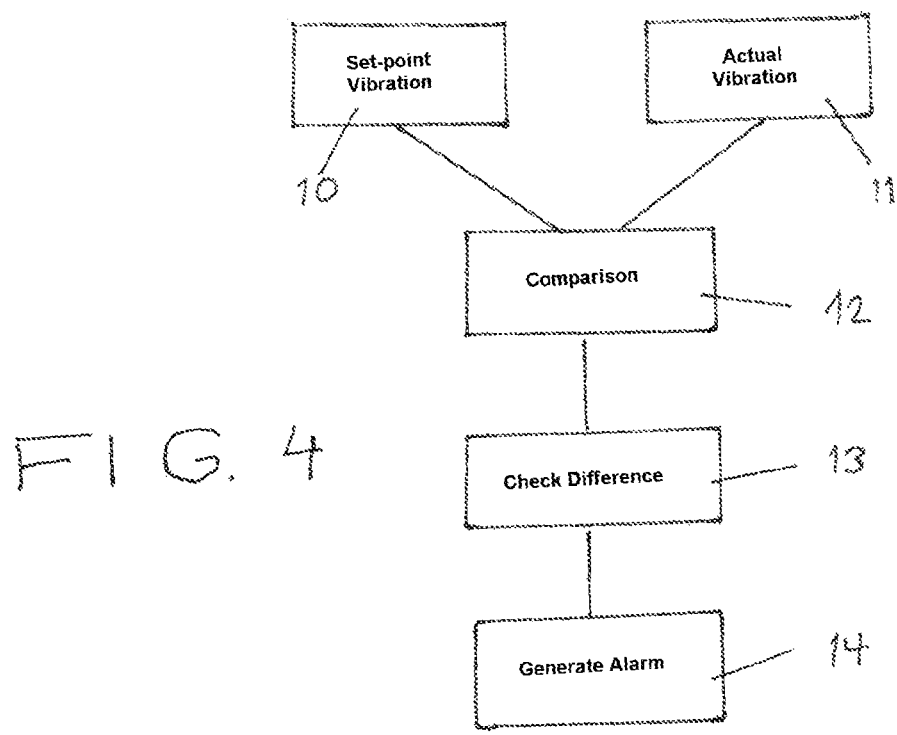
FIG. 4 is a schematic flow chart of the method of checking the functional condition of the induction crucible furnace.

FIG. 4 shows a schematic flow chart of the inventive method. In step 10 at least one parameter characterizing the vibratory behavior of the furnace is determined in the novel condition of the furnace under nominal conditions. In step 11 a measurement of this parameter is carried out in the operational condition of the furnace. Both values of these parameters are compared with one another in step 12, and a corresponding difference value is calculated. Then, in step 13 it is checked if the determined difference value exceeds a level corresponding to a functional condition of the furnace without defects. If this value is exceeded in step 14, an alarm signal is given indicating a defect of the furnace.

The invention claimed is:

1. A method of checking the functional condition of an induction crucible furnace, the method comprising the following steps:

establishing a set-point parameter corresponding to an optimum functional condition of the induction crucible furnace in a new condition of the induction crucible furnace under nominal conditions with regard to maintenance and operation and characterizing vibratory behavior thereof;

determining an actual-value vibratory-behavior parameter in operation of the induction crucible furnace; and comparing the parameters, determining any difference therebetween, and deriving the functional condition of the furnace from a magnitude of the difference to draw conclusions with respect to a wear condition of the furnace.

2. The method according to claim 1, wherein the set-point parameter is provided and is measured during operation of the induction crucible furnace.

3. The method according to claim 1, further comprising the step of:

generating an alarm signal or other message if the difference exceeds a predetermined threshold value.

4. The method according to claim 1, further comprising the step of:

using as the point parameter a range characterizing the vibratory behavior.

5. The method according to claim 1, wherein the actual-value parameter is determined by a sound-level measurement and is compared with a corresponding set-point sound level value.

6. The method according to claim 1, wherein the actual-value parameter is determined by measurement of electromagnetic waves and is compared with a corresponding set-point value.

7. The method according to claim 1, wherein the actual-value parameter of the induction crucible furnace is measured with inductive and/or capacitive sensors and/or piezo sensors.

8. The method according to claim 1, wherein the actual-value parameter of the induction crucible furnace is determined by evaluation by frequency analysis.

9. The method according to claim 1, wherein the actual-value parameter of the induction crucible furnace is determined by a long-term observation continuously or in regular intervals.

10. The method according to claim 1, wherein the actual-value parameter of the induction crucible furnace is determined by trend observation.

11. The method according to claim 1, wherein the actual value parameter is determined with an induction crucible furnace with channel inductor.

12. An induction crucible furnace constructed for carrying out the method according to claim 1.

* * * * *